(12) United States Patent
Liet

(10) Patent No.: US 9,491,927 B2
(45) Date of Patent: Nov. 15, 2016

(54) CONVEYOR DEVICE

(75) Inventor: Cornelis Hendricus Liet, Losser (NL)

(73) Assignee: Triolict Holding B.V., Oldenzaal (NL)

( * ) Notice: Subject to any disclaimer, the term of this patent is extended or adjusted under 35 U.S.C. 154(b) by 99 days.

(21) Appl. No.: 13/599,355

(22) Filed: Aug. 30, 2012

(65) Prior Publication Data

US 2013/0058189 A1 Mar. 7, 2013

(30) Foreign Application Priority Data

Sep. 1, 2011 (DE) .................. 20 2011 105 225 U

(51) Int. Cl.
*B01F 7/00* (2006.01)
*A01K 5/00* (2006.01)

(52) U.S. Cl.
CPC ..................... *A01K 5/004* (2013.01)

(58) Field of Classification Search
CPC .............. B01F 9/04; B01F 9/08; B01F 9/10; B01F 9/106; A01K 5/004
USPC ............ 366/220, 223, 292, 309, 603, 325.4, 366/315, 257, 261, 244, 302
See application file for complete search history.

(56) References Cited

U.S. PATENT DOCUMENTS

| | | | |
|---|---|---|---|
| 4,003,502 A | 1/1977 | Barcell | |
| 4,023,777 A * | 5/1977 | Kimmel | 366/221 |
| 4,725,007 A * | 2/1988 | Chupka | D21B 1/347 |
| | | | 162/261 |
| 5,456,416 A * | 10/1995 | Hartwig | 366/302 |
| 5,601,362 A * | 2/1997 | Schuler | 366/309 |
| 5,615,839 A | 4/1997 | Hartwig | |
| 2004/0179426 A1* | 9/2004 | Knight | 366/603 |
| 2006/0108464 A1* | 5/2006 | Rus | 241/260.1 |
| 2010/0195433 A1* | 8/2010 | Liet | 366/314 |

FOREIGN PATENT DOCUMENTS

| | | |
|---|---|---|
| DE | 202008006184 U1 | 11/2009 |
| EP | 738464 A1 | 10/1996 |

OTHER PUBLICATIONS

EP Search Report mailed Dec. 20, 2012, which issued in corresponding EP Application No. 12177653.8.

* cited by examiner

Primary Examiner — Tony G Soohoo
Assistant Examiner — Anshu Bhatia
(74) Attorney, Agent, or Firm — Fish & Richardson P.C.

(57) ABSTRACT

A conveyor device comprising a container with a bottom plane and a collection surface extending essentially parallel to the bottom plane, which is rotationally driven in a direction of rotation about an axis of rotation extending essentially vertically to the bottom plane. The collection surface is assigned a scraper that is fixed during conveyance. The scraper which is at a scraping distance above the collection surface, and reaches across the collection surface from the circumference of the collection surface in the direction of the axis of rotation.

7 Claims, 15 Drawing Sheets

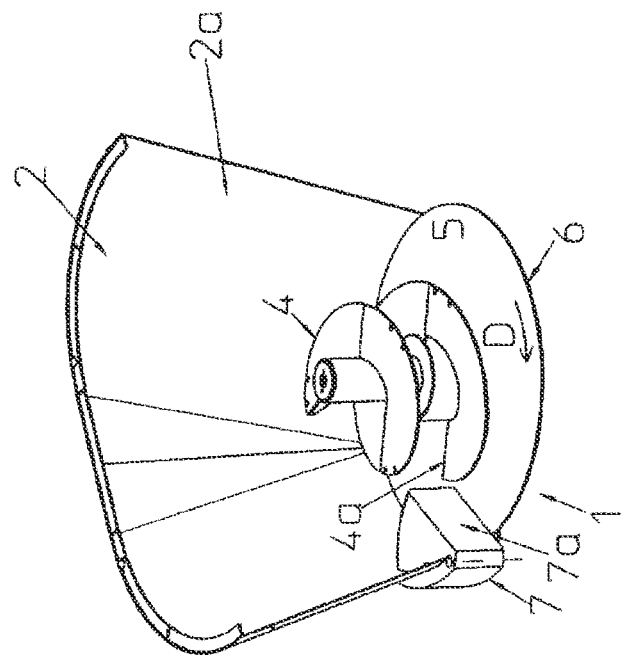
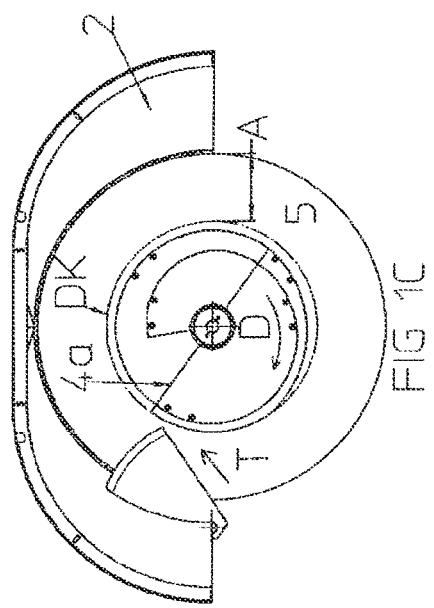
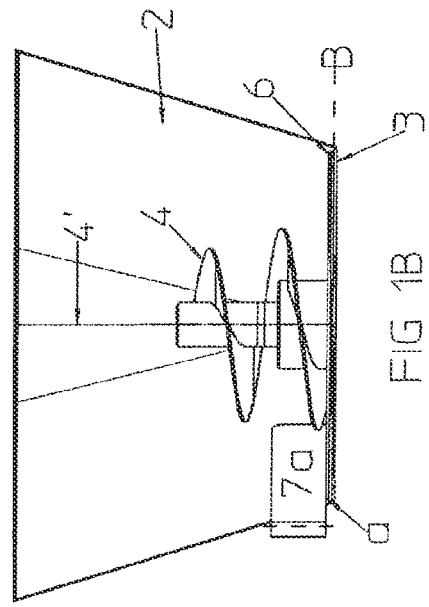

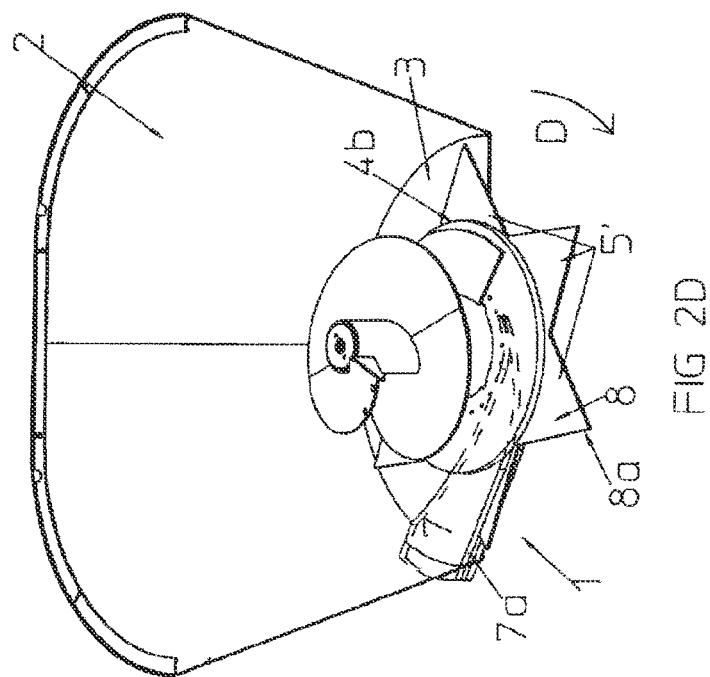
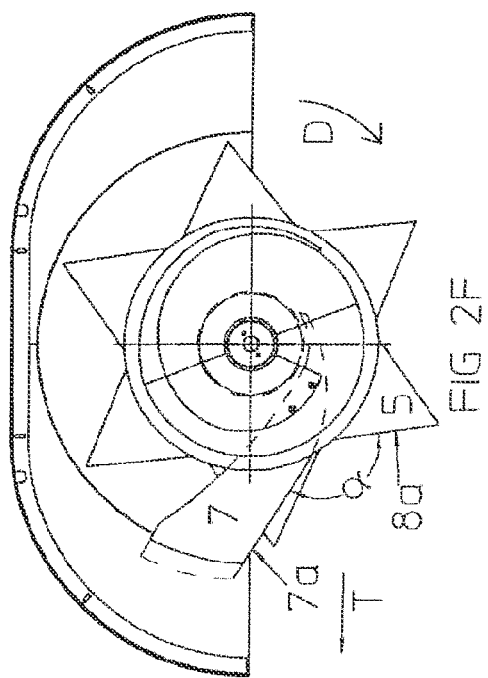
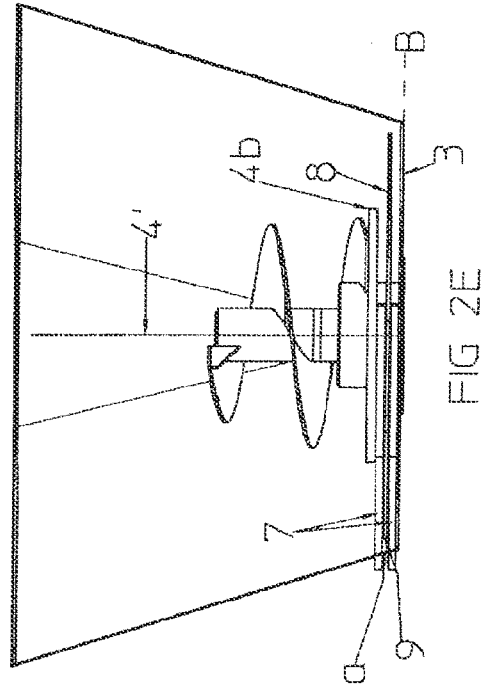
FIG 2D
FIG 2F
FIG 2E

DETAIL "A"

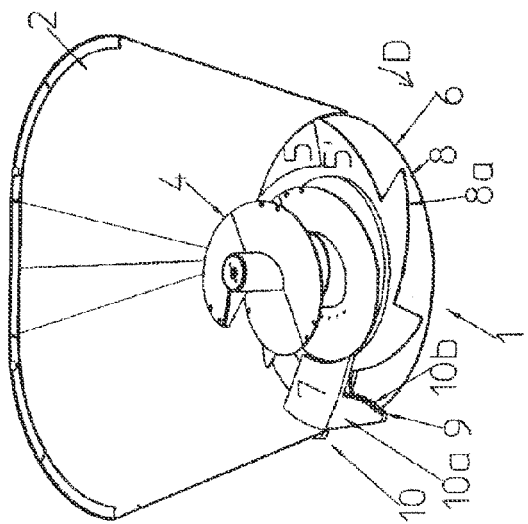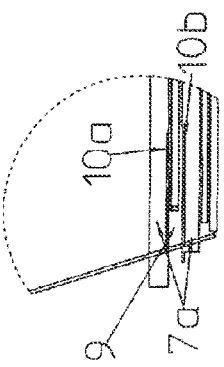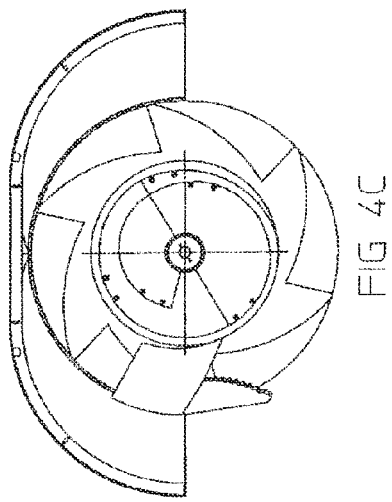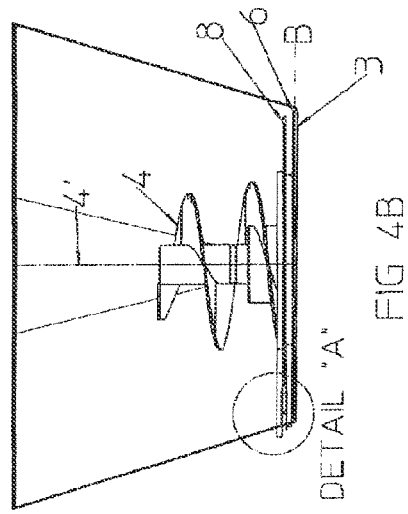

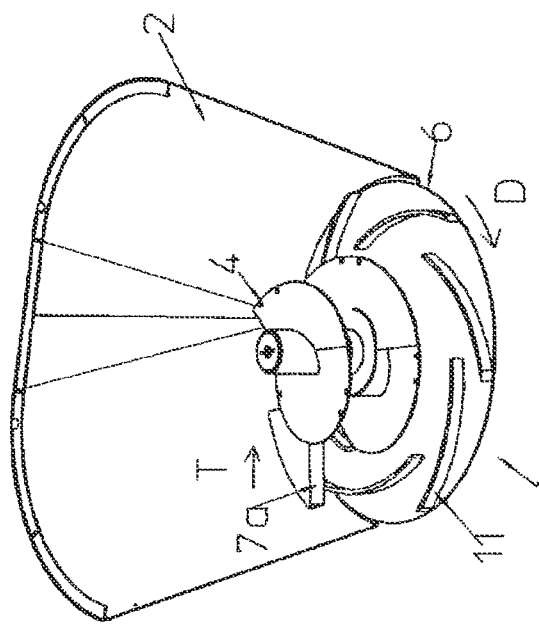
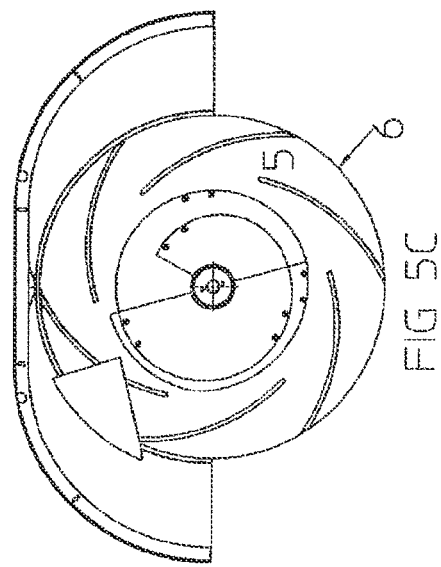
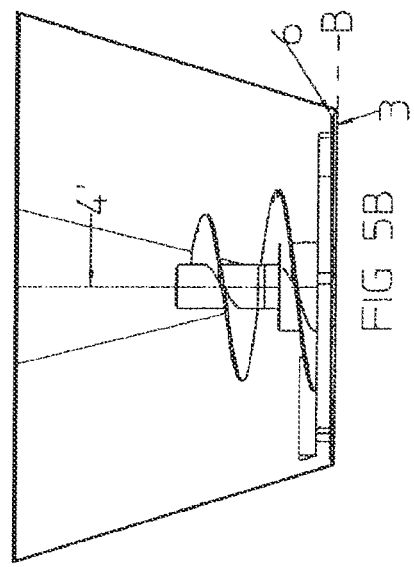

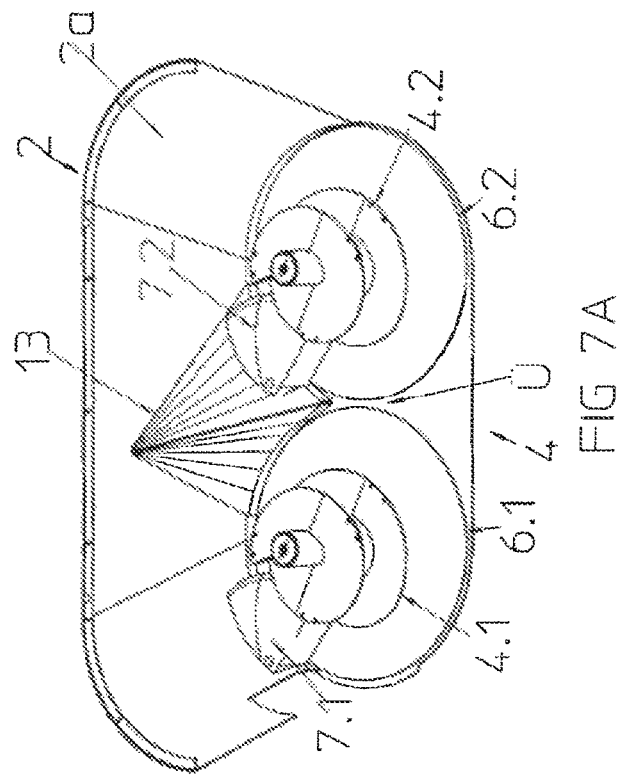
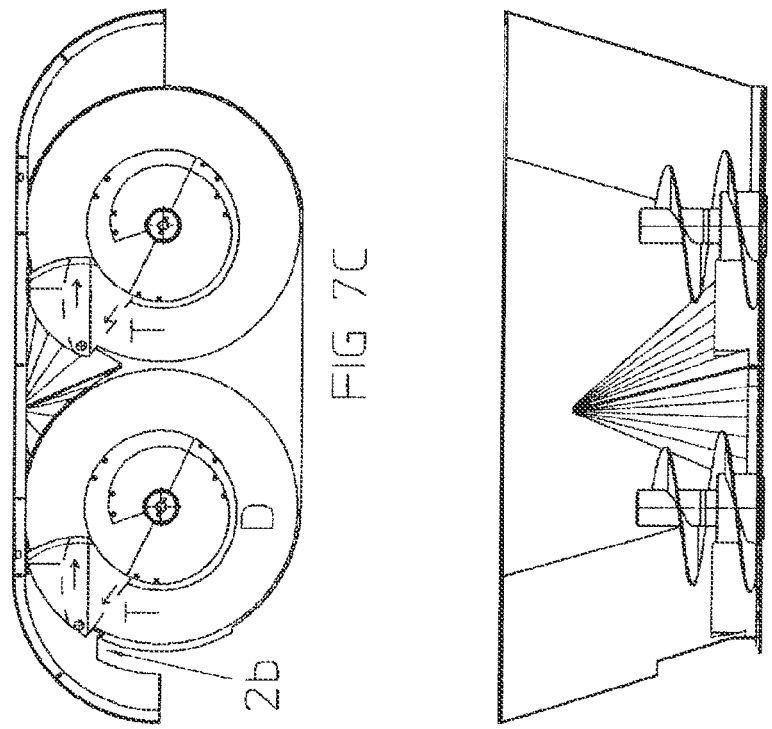

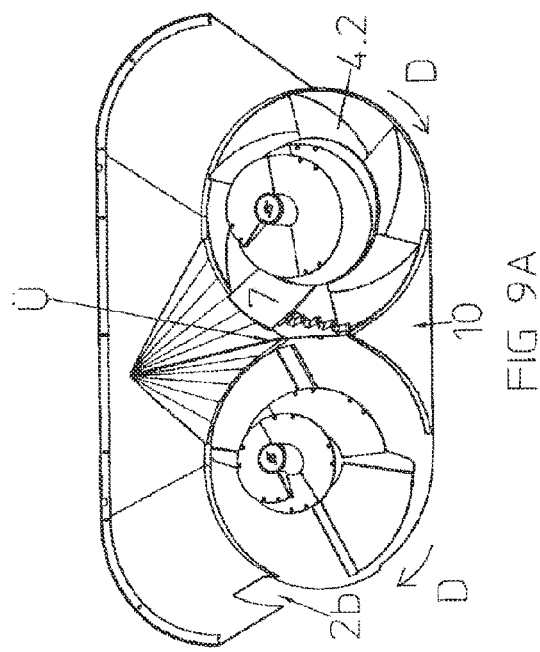
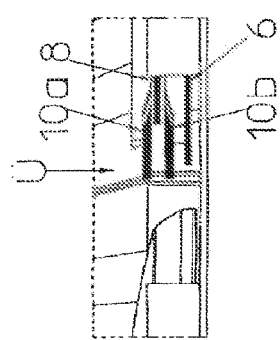
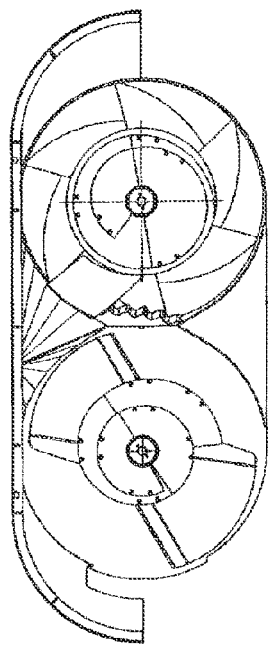
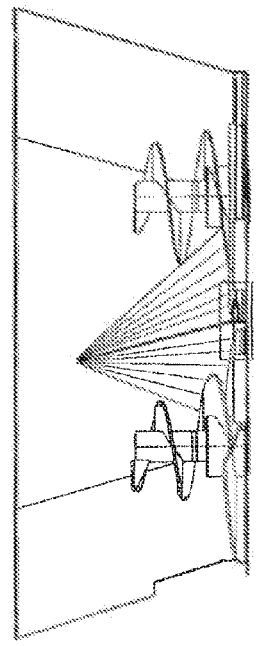

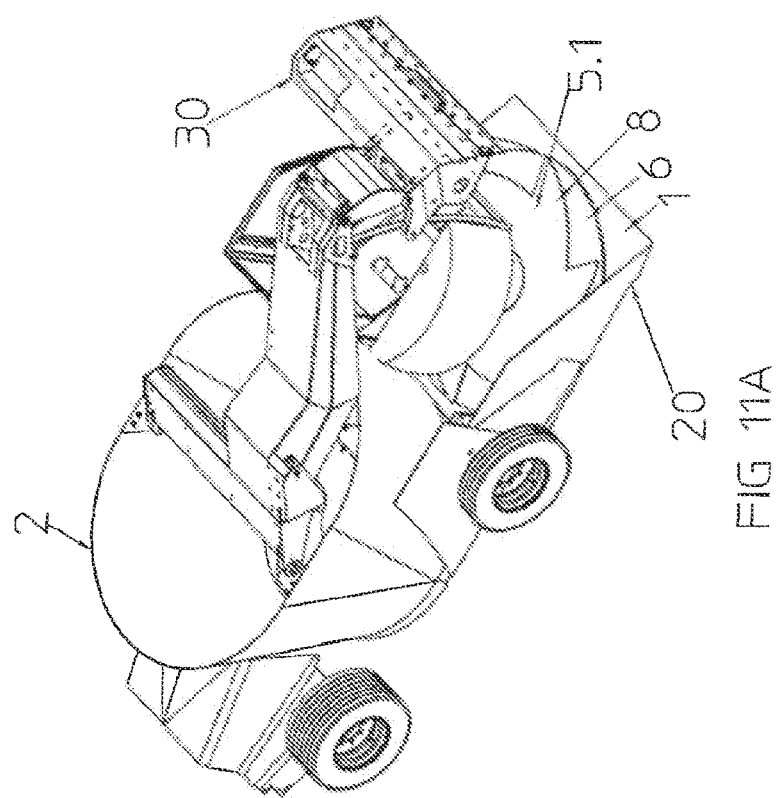
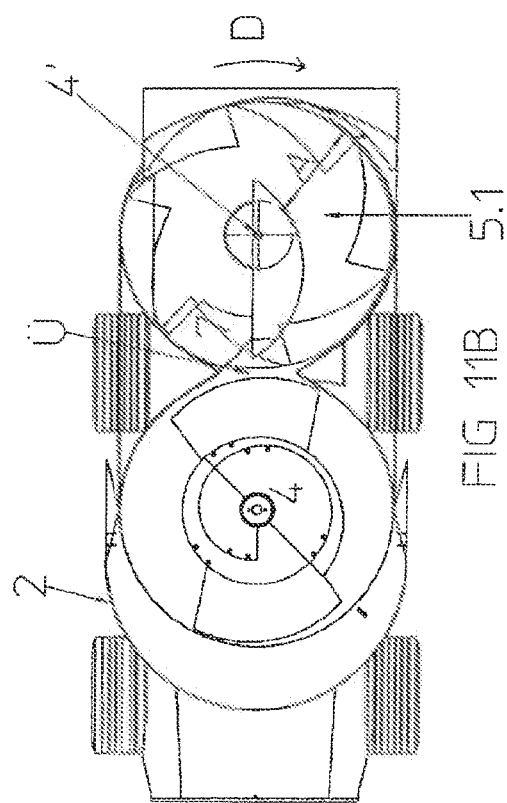

A-A

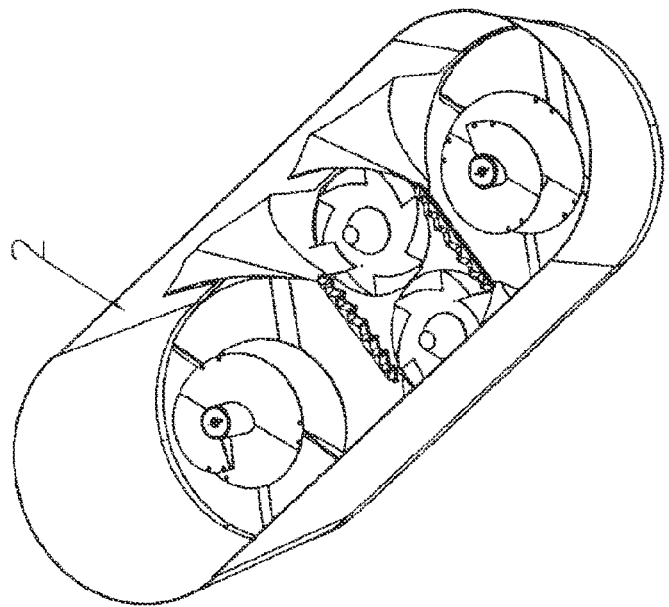
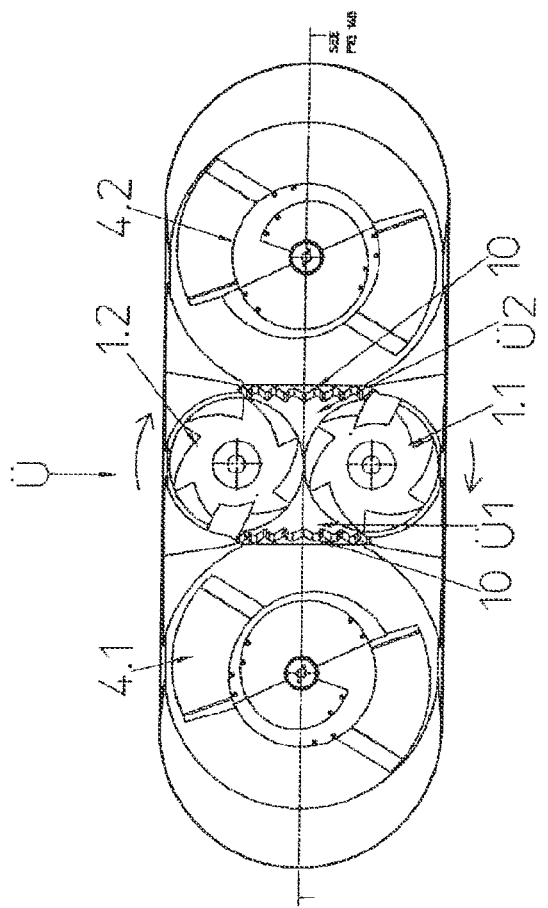
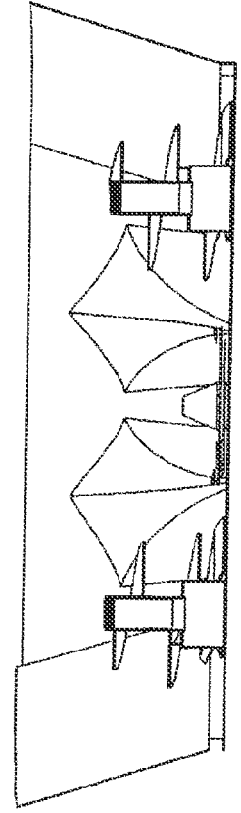

CONVEYOR DEVICE

FIELD OF THE INVENTION

The invention relates to a conveyor device which is particularly suitable for a feed mixer and comprising a container with a bottom plane and with a collection surface extending essentially parallel to the bottom plane and being rotationally driven in a direction of rotation about an axis of rotation which is essentially perpendicular to the bottom plane.

BACKGROUND OF THE INVENTION

Such a conveyor device is known from EP 738 464. The known conveyor device is designed for handling feed and comprises a container in which there is a loosening and mixing auger rotatably driven about a substantially vertical rotational axis. Below the mixing auger, a disk rotatably driven about the same rotational axis is provided, which protrudes in the circumferential direction from below the auger and covers a large part of the bottom of the container. The disk is designed as a centrifugal disk, which conveys the feed handled in the container from a discharge opening when the slider provided there has been opened.

Conveyor devices with support means for optimizing conveying of in particular feed are also known having various other structural designs. For example, U.S. Pat. No. 5,456,416 shows a feed mixer with a container and a mixing auger rotatably driven about a substantially vertical axis, wherein the turning circle on the bottom swept through by the mixing auger is noticeably smaller than the bottom itself. The distance between the mixing auger and the circumference of the bottom is bridged by a plate-shaped arm which extends only over a small angular range about the rotational axis and rotates along with the auger. In this manner, space can be created for receiving and circulating the feed, which, for example, improves mixing performance. On the arm, an attachment is provided which is arranged such that the feed is directed towards the rotational axis.

A similar construction of an arm for a mixing auger is shown in U.S. Pat. No. 7,507,016.

A feed mixer is known from US 2007/0274151, in which a drive arm is provided rotating about the rotational axis of the mixing auger beneath at least one of the mixing augers, sweeping over the bottom of the mixing container and pressing feed from the dispensing opening as soon as feed is to be dispensed.

If the dispensing opening is closed, then the drive only pushes the fed across the bottom of the container about the rotational axis.

OBJECT OF THE INVENTION

The invention has the object to provide a conveyor device with which conveying can be optimized. The object is accomplished with the conveyor device of the present invention.

SUMMARY OF THE INVENTION

According to the invention, it has been found that a rotating collection surface can also improve conveying performance within the container, if it is combined with a scraper, which reaches across the collection surface from the circumference towards the rotational axis. In this manner, feed applied from above onto the collection surface is deflected in a desired direction, where the direction and intensity of the deflection is controllable in a simple and inexpensive manner by means of the design and arrangement of the scraper. In addition, the scraper prevents the conveyed material from remaining on the wall of the container, which tends to occur in particular with feed treated in a mixing container with a mixing auger.

Controlling of deflection can for example be effected by inclining the scraper or its guide surface, respectively, with respect to the radial direction to the rotational axis.

Depending on the position of the leading end of the guide surface extending in the direction of the guiding surface, the material to be conveyed, in particular the feed can be directed outwardly or inwardly.

It is also possible to embody the scraper adjustably, so that it can take a different position depending on the required conveying task.

It is also preferable to move the scraper in an inoperative position, e.g. by pivoting, so that the conveyor can also be used without the scraper, if this is deemed necessary by the nature of the conveyed material or by the nature of the conveying task.

For cutting or loosening the conveyed material, the scraper may further be provided with a cutting device preferably being a knife edge and preferably being spring-loaded.

The scraper may further be provided with an extra guide device, which delivers the material to be conveyed to the scraper or supports the scraper in its operation.

In a preferred embodiment, the collection surface is formed on a closed disk.

The conveying activity is enhanced when there are drives above the collection area. The drives may be formed as guide webs directly on the collection surface, or an additional disk can be provided, at the circumference of which a drive is provided in the form of arms that are rotatably drivable.

However, it is further possible to design the collection surface on a plurality of arms.

In this, the arms have a substantially sawtooth or triangular shape when viewed in a plan view, the leading edge of which in the direction of rotation is designed as a drive.

The invention is particularly advantageously used in a feed mixer comprising at least one mixing auger. In this, the collection surface is arranged such that it protrudes radially below the mixing auger and is rotatable about the rotational axis of the mixing auger.

The scraper extends preferably to a turning circle of the mixing auger projected onto the collection surface or extends below the mixing auger up to the rotational axis.

For a feed mixer having a plurality of mixing augers, it is sufficient, depending on the conveying task, if only part of the mixing auger is provided with the collection surface with the scraper according to the invention.

Another field of use for the conveyor device according to the invention is the use as a simple conveying rotor, i.e. independently of a mixing auger.

The invention is particularly advantageously used for (self-propelled) mixer wagons for receiving the conveyed material and conveying it into the mixing container.

BRIEF SUMMARY OF THE DRAWINGS

The embodiments of the invention are illustrated below using the drawings in which;

FIGS. 1A-10 show a first embodiment of a conveyor device according to the invention, FIGS. 2D-2F show a modification of the second embodiment, FIGS. 4A-4D show a fourth embodiment of a conveyor device according to the invention, FIGS. 5A-5C show a fifth embodiment of a conveyor device according to the invention, FIGS. 7A-7C show a first example of use of a conveyor device according to the invention, FIGS. 9A-9D show a third example of use of a conveyor device according to the invention, FIGS. 11A-11B show a fifth example of use of a conveyor device according to the invention, FIGS. 14A-14C show an eighth example of use of a conveyor device according to the invention,

DETAILED DESCRIPTION OF THE INVENTION

Figure 2A:
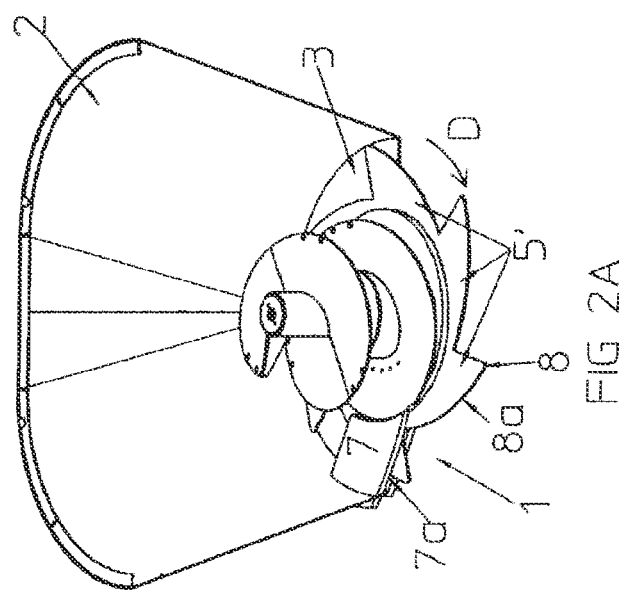
FIGS. 2A-2C show a second embodiment of a conveyor device according to the invention.

FIGS. 1A to 1C show a first embodiment of a conveyor device 1 according to the invention incorporated into a feed mixer in the form of a feed mixer wagon or a feed mixer container comprising a container 2 with a wall 2a, which has the common upwardly widening, funnel-like, usually long oval shape. The wall 2a is provided with a dispensing opening 2b, not seen here (cf. e.g. FIG. 7). A bottom 3 defines a bottom plane B and is substantially circular. A rotational axis 4' of a mixing auger 4 having the usual construction extends perpendicular on the bottom plane B. In the illustrated embodiment, the mixing auger has a single helix with a leading edge 4a extending in the direction of rotation D, which is arranged in the vicinity of the bottom. The direction of rotation D of the mixing auger 4 is selected such that the leading edge 4a receives a mixture from the bottom and transports it upwards, from where it drops back down towards the bottom.

The auger 4 tapers towards the top, where the largest projectable turning circle DK is formed by the leading edge 4a. The diameter of the turning circle DK is smaller than the diameter of the bottom 3, so that there is a space A between the radially outer end of the leading edge 4a and the wall 2. The space A defines a collection surface 5 on which the conveyed material comes to rest for being carried along in the direction of rotation D. The conveyed material is introduced through the upper opening of the container or is transported upwards by the mixing auger 4 and drops down from the upper trailing end of the mixing auger 4. The collection surface 5 is flat and in this embodiment without superstructures, substantially horizontal and rotates preferably with the same speed and same direction of rotation D about the rotational axis 4' of the mixing auger 4. This objective can be achieved, for example, by having the collection surface 5 fixedly connected with the mixing auger 4.

However, it can also be achieved, by having the collection surface 5 located on a separate closed circular disk 6, which is rotationally driven about the rotational axis 4' by either its own drive or by the drive of the mixing auger 4. The collection surface 5 extends essentially parallel to the bottom plane B, where the bottom plane B is defined either by the bottom 3 or by the disk 6 itself. Preferably the leading edge 4a of the mixing auger 4 is by a weld seam welded to the collection surface 5 so that no gap arises at this point, in which conveyed material can accumulate.

A scraper 7, being stationary with respect to the rotation D, during mixing protrudes into the path of the conveyed material on the collection surface 5 and forms a barrier for the conveyed material on the collection surface 5 in the direction of rotation D. The scraper 7 is provided with a guide surface 7a, in this embodiment the guide surface is planar, and preferably essentially perpendicular to the collection surface 5 and points in a direction opposite to the direction of rotation D. The guide surface 7a can also be arranged below an angle to the vertical plane. The scraper 7 and in particular its guide surface 7a is inclined relative to the radial plane with respect to the rotational axis 4', wherein the direction of this inclination and its extent is determined by the desired conveying characteristics. In the embodiment illustrated, the guide surface 7a with its radially inner end extends leadingly in the direction of rotation D, so that the conveyed material being transported on the collection surface 5 is transported in the inward direction, i.e. is transported in the direction of the conveying auger 4, as is indicated by the arrow T. For varying the inclination of the scraper 7 or its guide surface 7a, respectively, with respect to the radial plane and for adjusting the transport direction T caused by the scraper 7, the scraper 7 can be adjustable. Adjustment is effected for example by pivoting or sliding or repositioning the scraper 7. Furthermore, the scraper 7 is preferably to be set inoperative, either by moving it into an inoperative position or by removing the scraper from the container 2. Provisions are made for locking the scraper 7 in its various positions, in particular for mixing.

The scraper 7 has a scraping distance a (FIG. 1B) to the supporting surface 5, which is just sufficient to allow the supporting surface 5 to pass through substantially without friction. In any case, the scraping distance should have a dimension such that no conveyed material can end up between the scraper 7 and the collection surface 5 and there lead to blockages or produce a braking effect. The height of the guide surface 7a in the direction of the rotational axis 4' is preferably approximately the vertical distance between two turns of the helix of the mixing auger 4.

By means of the conveyor device 1 according to the invention, the conveyed material, transported upwardly by the auger 4 and again guided downwardly along the wall of the container 2, is deposited on the collection surface 5 and subsequently again supplied by the scraper 7 to the lower region of the conveying auger 4. In this manner, firstly, a larger effective loading volume of the container 2 is reached by reducing the size of the auger 4, which in turn reduces energy consumption of the conveyor device and the mixer, respectively. Nevertheless this arrangement ensures that the entire conveyed material is moved.

Figure 2C:
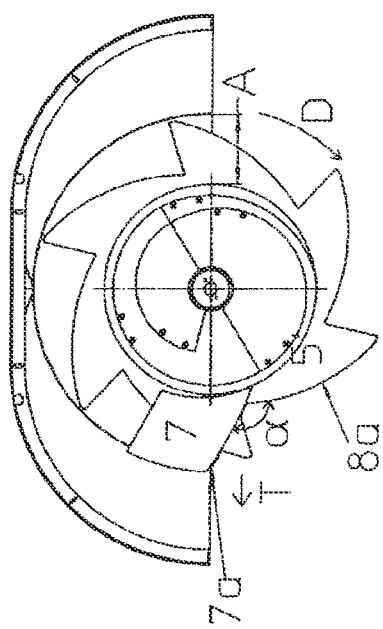
Figure 2B:
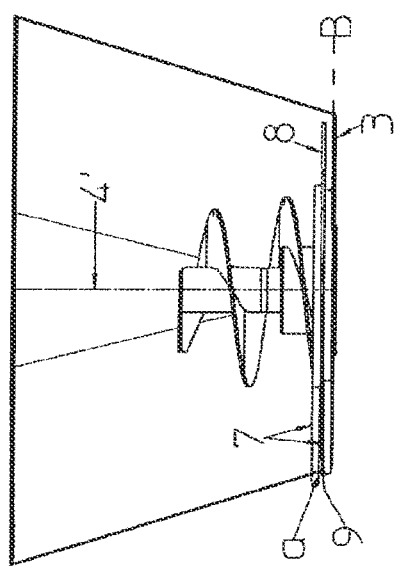
Figure 3A:
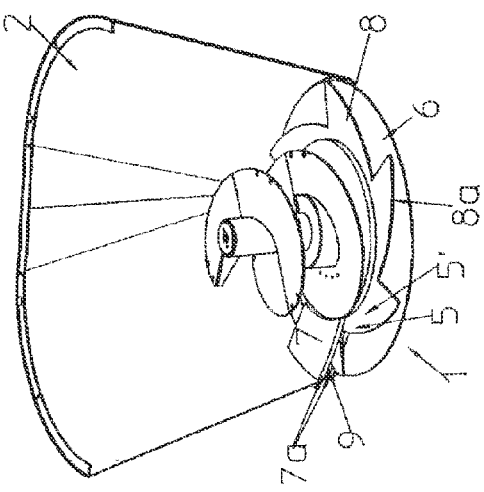
FIGS. 3A-3D show a third embodiment of a conveyor device according to the invention.
Figure 3D:
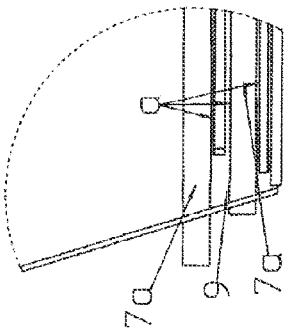
Figure 3C:
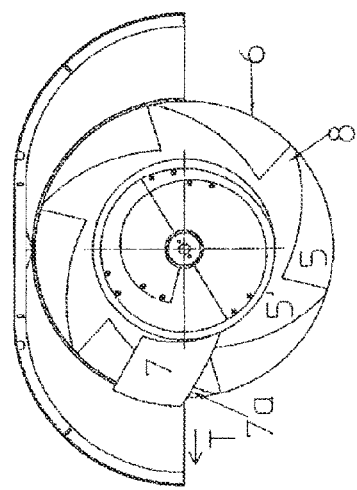
Figure 3B:
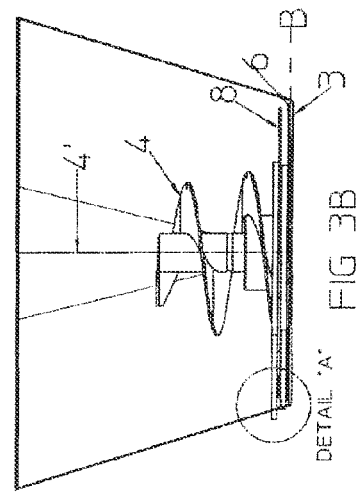

FIGS. 2A to 2C illustrate another embodiment of a conveyor device 1 according to the invention, where identical or similar components are designated by like reference numerals as in FIG. 1 and not explained again.

In the second embodiment, the conveyor device 1, instead of having a single, annular collection surface 5, comprises a plurality of collection surface areas 5' being spaced and substantially horizontally aligned with each other extending across the distance A. The individual surface areas 5' are flat, preferably without superstructures, in plan view (FIG. 2C) the individual surface areas are substantially sawtooth-shaped and preferably formed by a disk 8 that is circumferentially serrated or provided with radial arms. The sawtooth shape comprises a curved or rounded leading edge 8a, extending preferably spirally to the rotational axis 4' or from the inside outwardly towards the rear, i.e. in the direction against the direction of rotation D, which extends from the vicinity of the turning circle DK to the wall 2a of the container 2. This edge 8a acts as a drive for the conveyed material and pushes it into the direction of the rectilinearly extending scraper 7.

As shown in FIG. 2B, the disk 8 is arranged parallel to the bottom plane and above bottom plane B.

The collection surfaces 5' are here again assigned a scraper 7, which is equipped with a gap 9 through which the disk 8 can rotate. In this arrangement, the gap 9 has preferably twice the height of a scraping distance a plus the material thickness of the disk 8, so that no material to be conveyed can enter into the gap 9. Beyond that, the scraper 7 reaches to the bottom 3, so that material dropping down between the individual collection surfaces 5' to the bottom 3 also returns to the conveyor circuit when it is collected by the leading edge acting as the drive 8a.

The guide surface 7a of the scraper 7 is here formed for an outwardly facing transport direction T, i.e. the radially outer end of the guide surface 7a is leadingly disposed in the direction of rotation D. The angle a between the guide surface 7a and the leading edge 8a should have such a dimension that no conveyed material can be squeezed between the two, i.e. the angle should preferably be more than 90°, preferably about 120°. The height of the guide surface 7a in the direction of the rotational axis 4' is less than in the first embodiment and equals only to about the material thickness of the helix of the mixing auger 4 or the height of a horizontal disk or of a base 4b below the mixing auger 4 on which it rests.

FIGS. 2D to 2F show a modification of the embodiment of FIGS. 2A to 2C. The same or similar components correspond to the components of these figures. The modification differs from FIGS. 2A to 2C, firstly, by a modified form of the arms of the collection surfaces 5' of the disk 8, where here the collection surfaces are formed as a substantially equilateral triangle and the disk 8 is approximately star-shaped. The leading edge 8a of the individual collection surfaces 5' is straight and disposed substantially tangential to the rotational axis 4'. As in FIGS. 2A to 2C, six collection surfaces 5' are provided, which are distributed at equal distances around the rotational axis 4', where the tips of the triangular shape point towards the wall 2.

The second modification relates to the shape and arrangement of the scraper 7. The scraper 7 extends, as shown in particular in FIGS. 2F and 2D, up to the rotational axis or the turning shaft 4 of the mixing auger, respectively, and is supported thereon. The scraper 7 further comprises the two scraper plates forming a gap 9, wherein the disk 8 moves with the supporting surfaces 5' through the gap 9.

The two plates of the scraper 7 engage below a base 4b of the mixing auger 4, where the base 4b is formed substantially as a circular disk and substantially corresponds to the turning circle DK or has a slightly larger diameter than the latter, such that the base 4b, as shown in particular in FIGS. 2D and 2F, protrude from below the mixing auger 4. The scraper 7 has an approximately scythe-like shape, where the guide surface 7a facing against the direction of rotation D is curved outwardly. By means of the scythe shape, the scraper 7 is pressed against a turning shaft of the mixing auger 4, so that it can be supported against the conveying forces. In this modification, a straight leading edge 8a is combined with a curved guide surface 7a.

FIGS. 3A to 3D illustrate a third embodiment of a conveyor device 1 according to the invention, where identical or similar components are designated by like reference numerals and not explained again.

In the third embodiment, the disks 6 and 8 are combined in a single conveyor device 1. In this embodiment, the disk 6 with the collection surface 5 extends above the bottom 3 and the disk 8 with the collection surfaces 5' at a distance above the collection surface 5, but still below the mixing auger 4. All three components, i.e., the mixing auger 4 and the two disks 6 and 8 are driven independently of each other or jointly (with respect to the direction of rotation and speed) about the rotational axis 4' of the mixing auger 4, while one of the disks can also be stopped. The distance between the two disks 6 and 8 is measured such that conveyed material dropping down between adjacent collection surface areas 5' onto the collection surfaces 5 is not squeezed between the two disks, but is also transported to the scraper 7. The scraper with the gap 9 according to the second embodiment is used as a scraper 7, which is arranged above the disk 6 and also with the disk 6 has the scraping distance. The scraper 7 is here as well stationary with respect to the disks 6, 8 and the auger 4. Its guide surface 7a, both in relation to the disk 6 as well as in relation to the disk 8, is presently designed for an outwardly directed transport direction T (cf. second embodiment). In the third embodiment, the conveyed material lying on the lower closed disk 6 accumulates in front of the guide surface 7a and is accumulated outwardly and pushed away in the desired direction or possibly also rises above the scraper 7.

FIGS. 4A to 4D illustrate a fourth embodiment of a conveyor device according to the invention, where identical or similar components are designated by like reference numerals and not explained again.

The fourth embodiment differs from the third embodiment only in the arrangement of a cutting device 10, which is here associated with the scraper 7. The cutting device 10 has one or two knife edges 10a and 10b which are arranged on one or both sides of the gap 9 and extend the latter in a direction opposite to the direction of rotation D. In this embodiment, the knife edges 10a, 10b extend approximately from the radial center of each guide surface 7a in a slight curve outwardly to the wall of the container 2. The conveyed material is thereby during rotation in the direction of rotation D pressed against the respective serrated knife edge both on the lower disk 6 as well as on the upper disk 8 so that the conveyed material can be cut. Preferably (a) knife edge (s) is/are pivotally or yieldingly arranged and spring-loaded.

FIGS. 5A to 5C illustrate a further embodiment of a conveyor device 1 according to the invention, where identical or similar components are designated by like reference numerals and not explained again in more detail.

The fifth embodiment is based on the first embodiment according to FIGS. 1A to 1C and comprises the disk 6 with the collection surface 5 which is arranged at a distance above a bottom 3 defining a bottom plane B. The fifth embodiment differs from the second to fourth embodiments by the fact that the disk 6 is assigned drives 11. The drives 11 are preferably provided in the form of drive webs which are distributed in the circumferential direction substantially spirally around the rotational axis 4'.

The drive 7 being stationary relative to the rotational movement D is with its guide surface 7*a* designed for a transport direction T inwardly, i.e. in the direction of the mixing auger 4, i.e. its radially inner end is leading with respect to the direction of rotation D (in analogy to the first embodiment).

Accordingly, also the drives 11 are designed for a transport direction radially inwardly, i.e. their radially outer ends are leading in the direction of rotation and have a greater distance to the rotational axis 4' than their ends trailing in the direction of rotation D.

Figure 6A:
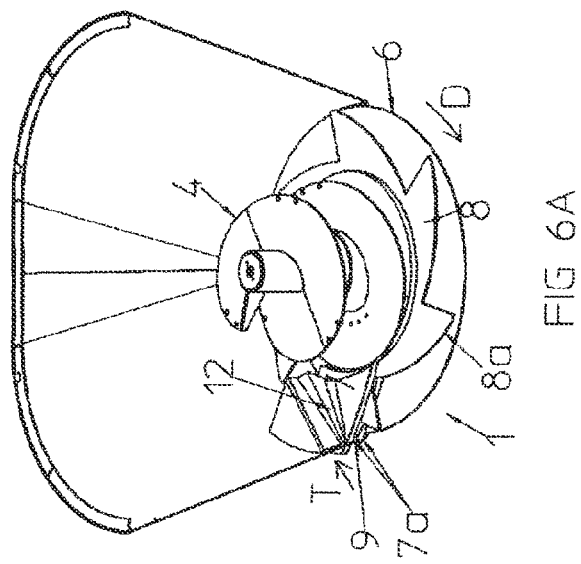
FIGS. 6A-6C show a sixth embodiment of a conveyor device according to the invention.
Figure 6C:
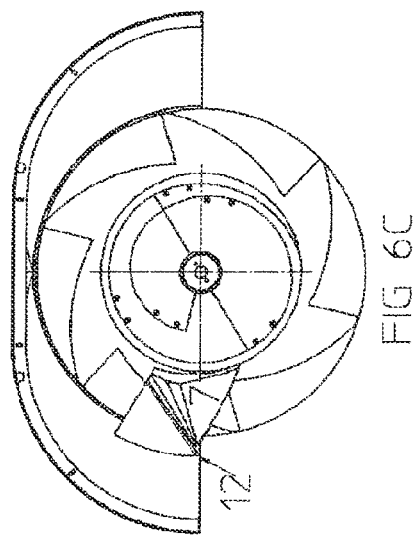
Figure 6B:
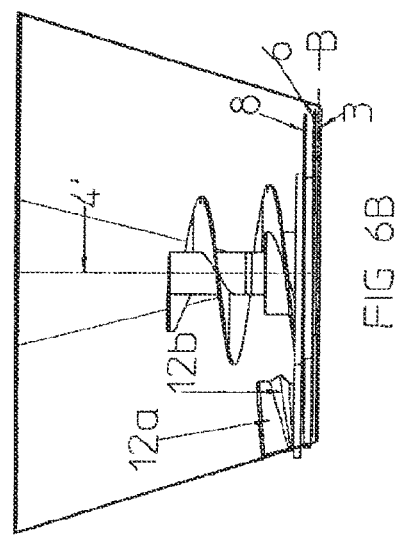

FIGS. 6A to 6C illustrate a sixth embodiment of a conveyor device 1 according to the invention, where identical or similar components are designated by like reference numerals as in the previous embodiments and not explained again.

The sixth embodiment is based on the third embodiment and comprises the disks 6 and 8 and the mixing auger 4, which are jointly or independently of each other rotationally driven in the direction of rotation D about a common rotational axis 4'. The scraper 7 with the two guide surfaces 7*a* separated by the gap 9 is assigned a guide device 12 which itself reverses the transport direction T per sé induced by the guide surfaces 7*a*. For this purpose, the guide device 12 comprises a baffle 12*a* standing upright and pointing in a direction against the direction of rotation D with a guide member 12*b* arranged in an outwardly inclined manner. The guide member 12*b* is here designed in the form of a pyramid-shaped prism with two baffle surfaces converging to an outer tip. In this manner, the conveyed material being pressed by the guide surfaces 7*a* and the drives 8*a* against the closed baffle wall and thereby rising up the wall, is in its direction deflected and conveyed in the desired transport direction T towards the mixing auger 4.

In the previous embodiments, the conveyor device has been illustrated only in connection with a mixing container with a single mixing auger. The invention, however, is not limited to this embodiment.

FIGS. 7A to 7C show the use of the first embodiment in a mixing container with two mixing augers 4, here shown as mixing augers 4.1 and 4.2, which are in a transfer region connected to one another for the exchange of conveyed material. Each mixing auger is illustrated with one of the discs 6 and a scraper 7, each as a disc 6.1, 6.2 and scrapers 7.1, 7.2. In this embodiment, one of the scrapers 7.1 is arranged on the wall 2*a* of the container 2 and in the direction of rotation D behind an opening 2*b* provided there, and the other scraper 7.2 at a distributor cone 13 disposed in the knuckle between the two mixing augers 4.1, 4.2 and in the direction of rotation D behind a transfer region between the augers 4.2 4.1. Both scrapers 7.1, 7.2, are pivotable from the position depicted in FIG. 7C as a dashed line and in FIG. 7C as a solid line. By pivoting the scraper 7 outwardly, better loading of the auger can be achieved. By pivoting the scraper inwardly, better dosage via the dosing aperture 2*b*—only slightly indicated—regarding the mixing auger 4.1 and a better transfer performance from the mixing auger 4.2 to the mixing auger to 4.1 can be achieved.

Figure 8A:
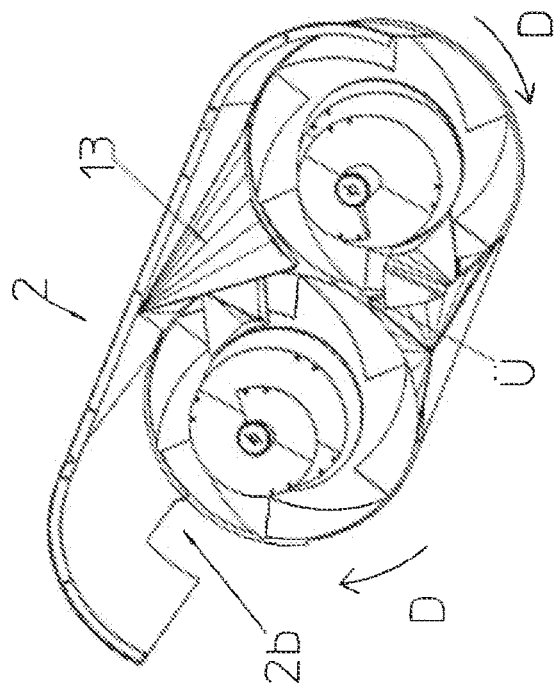
FIGS. 8A-8C show a second example of use of a conveyor device according to the invention.
Figure 8C:
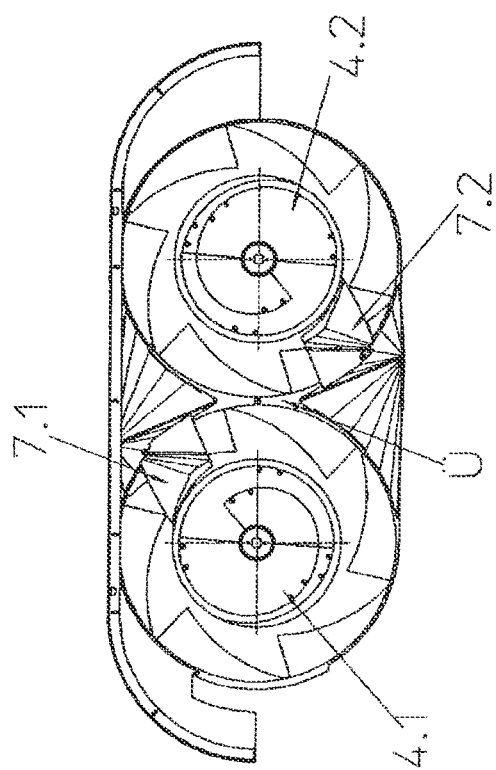
Figure 8B:
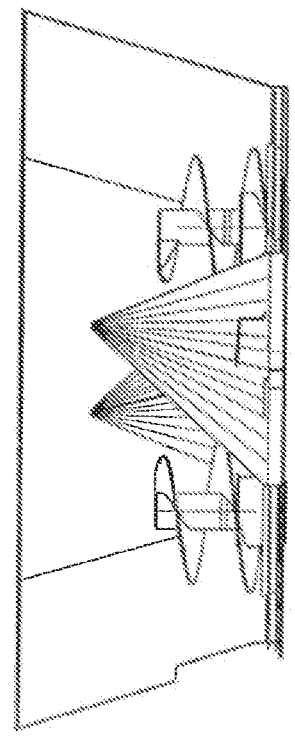

FIGS. 8A to 8C describe a use of the embodiment according to FIG. 6 in the manner shown in FIG. 7, where two of the conveyor devices according to FIG. 6 are accommodated in a common container 2 and the scrapers 7.1 and 7.2 provided with the guide device 12 are pivotally mounted in the same manner as shown in FIGS. 7A and 7B. In this embodiment, the associated scrapers 7.2, 7.2 are arranged in mirror image to each other and respectively in the direction of rotation D of the associated mixing auger 4 upstream of a transfer region Ü between the mixing augers 4.1 and 4.2.

FIGS. 9A to 9D show an example of use of the conveyor device according to FIGS. 4A to 4C in which the scraper 7 is assigned a cutting device 10. The scraper 7 is associated with the mixing auger 4.2 and arranged in direction of rotation D downstream of the transfer region between the two mixing augers 4.1 and 4.2, i.e. at the end of the transfer region Ü. In this, the upwardly-facing surfaces of the knife edge 10*a*, as shown in FIG. 9D, form a smooth closed transfer surface in the transfer region Ü, which does not hinder passage of the conveyed material.

The lower knife edge 10*b* can be arranged in the same manner. The conveyed material is in this embodiment pushed along and through the knife edges 10*a*, 10*b*, so that it transfers from one to the other mixing chamber (2-way).

Figure 10A:
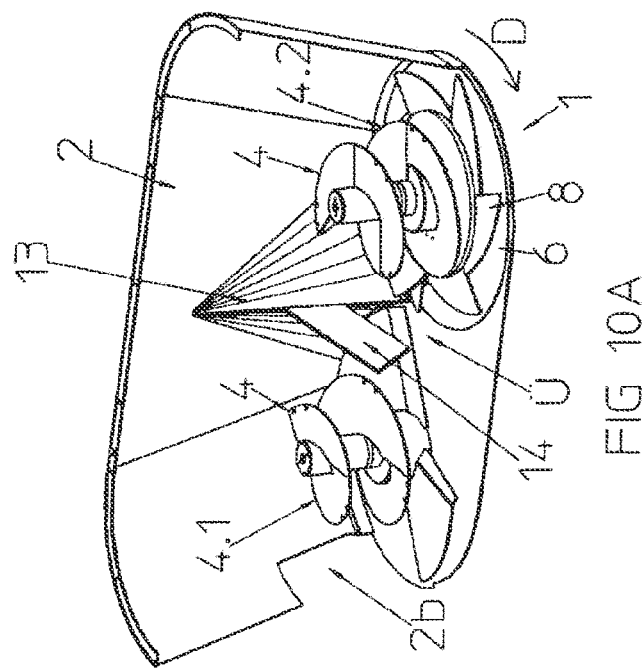
FIGS. 10A-10B show a fourth example of use of a conveyor device according to the invention.
Figure 10C:
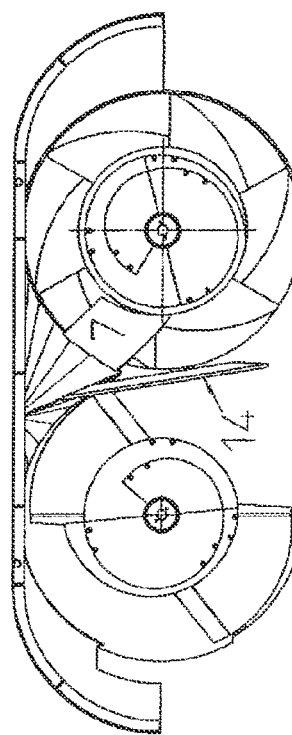
Figure 10B:
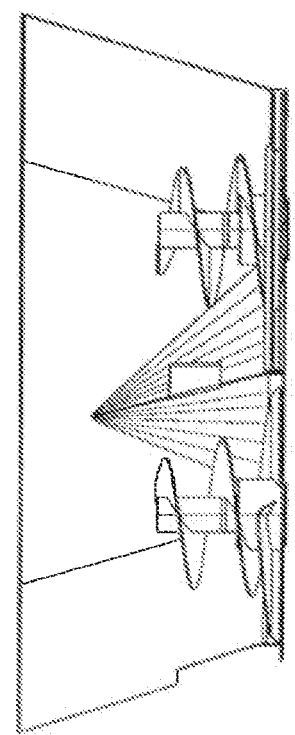

FIGS. 10A to 10C show an example of use in which again two or more mixing augers 4 are arranged in a common container 2 of a feed mixer, not all of which are provided with the conveyor device 1 according to the invention, in the illustrated embodiment with two mixing augers 4, only one. In the illustrated embodiment, this is the mixing auger 4.2, which is located at a distance from the discharge opening 2*b*. In this embodiment, the second mixing auger 4.2 comprises the conveyor device according to FIG. 3 with the closed disk 6 and the disk 8 provided with the arms and the two-part scraper 7 with the gap 9, which in the direction of rotation D is arranged downstream of the transfer region between the two augers 4.1 and 4.2.

In this embodiment, a partition 14 is provided at the distributor cone 13 between the two mixing augers 4.1, 4.2, which limits passage upwardly in the transfer region Ü. This embodiment is particularly suitable where the mixer is not used horizontally. By means of the partition 14, the conveyed material accumulates in the transfer region Ü, by means of which gravity conveyance in an inclined position is slowed down and a better circulation results with forced transfer between the mixing augers.

FIGS. 11A and 11B show another example of how the invention is used in a self-propelled feed wagon. In this embodiment, the conveyor device according to the invention is designed as a conveying rotor and arranged in the receiving region for loading a container 2 with or without a mixing auger 4. The conveying rotor corresponds to the third embodiment of the invention i.e. it comprises the closed disk 6 and the disk 8 provided with arms, which are driven jointly or independently of each other about a common rotational axis 4' (direction of rotation, speed, switching on and off). However, the rotor comprises no mixing auger. The associated scraper 7 is disposed at the transfer region into the container 2 and is in the direction of rotation D located downstream of the transfer region Ü.

Following the transfer region Ü, a further conveyor device 1 according to the invention or a mixing auger can be provided which, as shown, is not provided with the conveyor device 1 according to the invention, but can be also provided therewith. Also to other mixers, such as horizontal mixers, vertical mixers with one or more augers or (other) conveyor devices can follow.

Figure 12A:
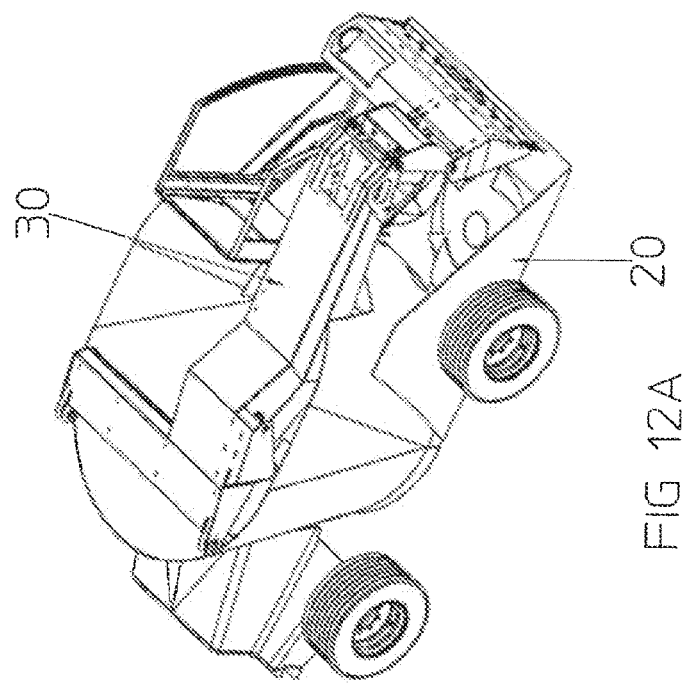
FIGS. 12A-12B show a sixth example of use of a conveyor device according to the invention.
Figure 12B:
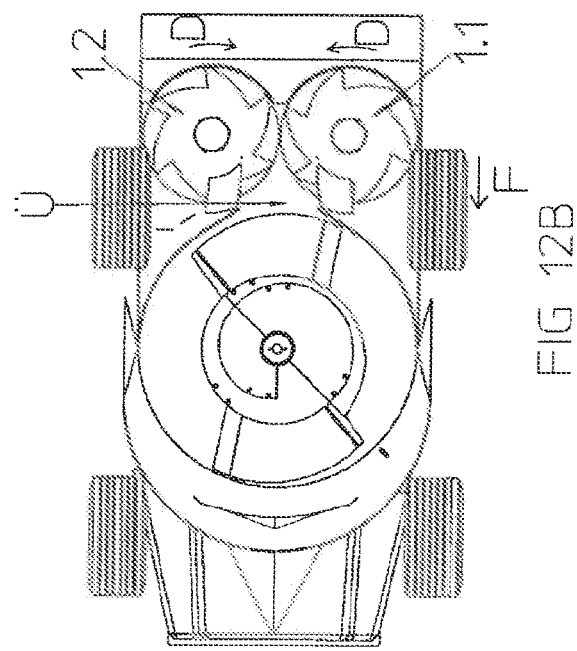

The example of use according to FIGS. 12A and 12B corresponds to the example of use according to FIGS. 11A and 11B, with the only difference being, that instead of one conveying rotor, two conveyor devices 1.1 and 1.2 formed as conveying rotors are provided in the loading region. The two conveying rotors 1.1 and 1.2 are in the illustrated embodiment arranged transversely and symmetrically to the conveying direction F side by side and driven rotating inversely. In this embodiment, the direction of rotation D is selected such that the two conveying rotors 1.1 and 1.2 converged at the rear end in the conveying direction F. The scrapers 7 of both conveying rotors are each provided on one side of the transfer region Ü. The conveying rotors 1.1 and 1.2 are otherwise designed according to the embodiment shown in FIG. 3. The conveying rotors 1.1 and 1.2, however, can also be arranged obliquely offset to each other in the direction of travel, allowing a larger diameter of the rotors without having them extend beyond the lateral width.

In the examples of use of FIGS. 11 and 12, the rotors can be accommodated in a lowerable area 20 of the container 2, which for easier loading can be pivoted to the bottom and thereby form an inclined loading ramp onto which the conveyed material can be drawn using conventional loading equipment, such as the illustrated loading plate 30.

Figure 13A:
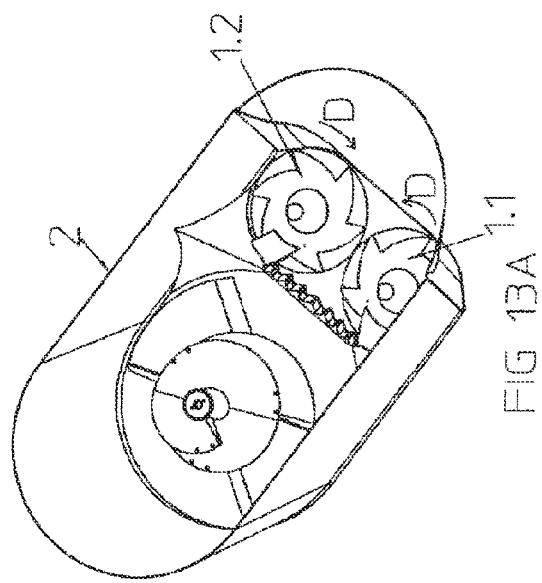
FIGS. 13A-13C show a seventh example of use of a conveyor device according to the invention.
Figure 13C:
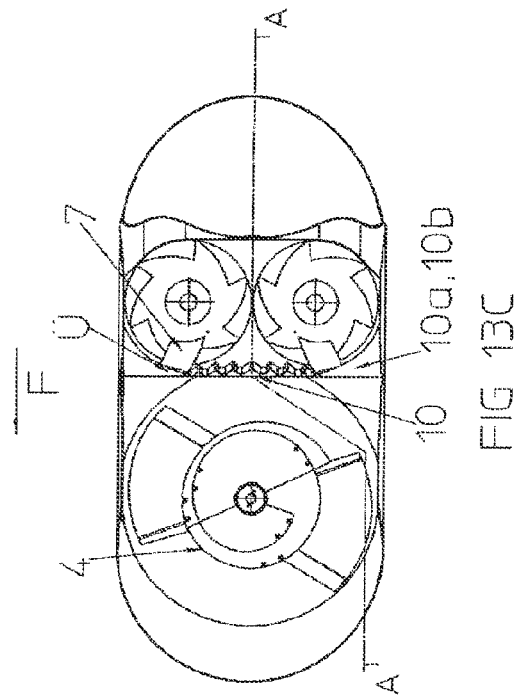
Figure 13B:
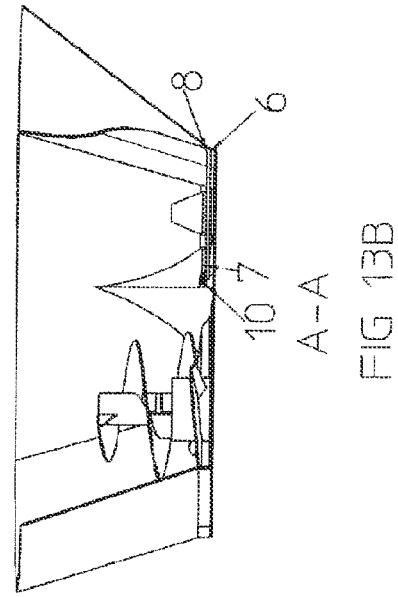

FIGS. 13A-13C show a seventh example of use of a conveyor device according to the invention. This example of use shows a design similar to FIG. 12, configured for use in a closed container 2. In this embodiment, one of the conveying augers is replaced by two conveying rotors 1.1 and 1.2, which are formed according to the fourth embodiment shown in FIGS. 4A to 4C, but are arranged in mirror image to each other. Thereby, the knife edges 10a, 10b of the cutting device 10 form a continuous cutting line across the transfer region Ü. Beyond the transfer region, there is a conventional mixing auger 4, which can be provided with a conveyor device 1, but which in the illustrated example of use, however, is without any conveyor device.

By replacing one of the mixing augers with the two small conveying rotors, the energy consumption can be reduced since the two small rotors require less energy than a normal sized mixing auger. By replacing the mixing auger with the rotors, much volume can thereby be handled using little power. By means of the cutting device, large bales can be quickly broken down and cut. This often causes problems with small mixers having only two mixing augers. The bale stays on top in the mixing chambers, is pressed against the wall and no longer reachable by the auger. In the illustrated example of use, the bale immediately or sooner or later drops into the region above the rotors where it can be broken down safely.

The example of use shown in FIGS. 14A to 14C is similar to the example of use as depicted in FIG. 13, with the only difference being, that two mixing augers 4.1, 4.2 are provided with or without the conveyor device according to the invention. The two mixing augers are connected to each other via the two conveying rotors 1.1 and 1.2, which are arranged in the transfer region Ü between the two augers. In this embodiment, the conveying rotors 1.1 and 1.2 each comprise a transfer region Ü1 to the first auger 4.1 and Ü2 to the second mixing auger 4.2. The scrapers 7 of the two rotors are each arranged such that the associated cutting device 10 respectively extends across the entire associated transfer region Ü1 or Ü2, respectively. The conveying rotors 1.1 and 1.2 are driven in the same direction.

As a modification of the described embodiments and examples of use, the details described with reference to the figures can be readily interchanged. The conveyor device according to the invention can be used everywhere where the material to be conveyed has properties similar to animal feed.

The invention claimed is:

1. Conveyor device of a feed mixer, the conveyor device comprising
   a container having a bottom plane and a wall,
   a collection surface defined by a top surface of a circular flat disk or formed by a plurality of arms arranged at the periphery of the flat disk, each of said arms having a saw-tooth shape or a triangular shape and located above said bottom plane and extending parallel to said bottom plane, the collection surface being rotationally driven in a direction of rotation about an axis of rotation essentially perpendicular to said bottom plane, said bottom plane and said wall of said container being stationary in relation to the rotationally driven collection surface,
   at least one scraper fixed during operation of said conveyor device with respect to said bottom plane and said wall of said container relative to said rotationally driven collection surface, said scraper mounted at a first scraping distance above said collection surface and being functionally associated with said collection surface, said scraper extending from a location at the circumference of said collection surface across the collection surface in a direction towards said axis of rotation and having at least one guide surface extending with an inclination relative to a radial plane on said axis of rotation and wherein the conveyor device is integrated into the feed mixer having at least one mixing auger and is a material supplying conveyer device separated from said at least one mixing auger and is integrated into a feed mixer wagon comprising the at least one mixing auger, said material supplying conveyer device being integrated between a loading station or receiving region and said at least one mixing auger.

2. The conveyor device according to claim 1, wherein said guide surface of said scraper has a radially outer end at the circumference of the collection surface and a radially inner end located above said collection surface, said radially outer end being either leading in the direction of rotation relative to said radially inner end or being trailing in the direction of rotation with respect to said radially inner end.

3. The conveyor device according to claim 1, wherein a guide device comprising an upright standing baffle pointing in a direction counter to the direction of rotation is associated with said scraper.

4. The conveyor device according to claim 1, further comprising a plurality of drive webs formed by drive edges of arms at the circumference of a rotatably driveable flat disk, said disk being located above said collection surface.

5. The conveyor device according to claim 1, wherein said collection surface protrudes from below beyond a turning cycle of a mixing auger of the feed mixer, the mixing auger and the collection surface having a common axis of rotation.

6. The conveyor device according to claim 5, wherein said scraper extends from the circumference of said collection surface in the direction towards the axis of rotation up to a turning cycle of a leading edge of a helix of the mixing auger.

7. The conveyor device of claim 1 wherein the feed mixer wagon is self-propelled.

\* \* \* \* \*